(12) United States Patent
Jin

(10) Patent No.: US 10,067,391 B2
(45) Date of Patent: Sep. 4, 2018

(54) PLANAR DISPLAY PANEL AND DISPLAY DEVICE

(71) Applicants: Shanghai AVIC OPTO Electronics Co., Ltd., Shanghai (CN); Tianma Micro-Electronics Co., Ltd., Shenzhen (CN)

(72) Inventor: Huijun Jin, Shanghai (CN)

(73) Assignees: SHANGHAI AVIC OPTOELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 362 days.

(21) Appl. No.: 14/852,419

(22) Filed: Sep. 11, 2015

(65) Prior Publication Data

US 2016/0187745 A1    Jun. 30, 2016

(30) Foreign Application Priority Data

Dec. 30, 2014    (CN) .......................... 2014 1 0857389

(51) Int. Cl.
G02F 1/1333 (2006.01)
G02F 1/1343 (2006.01)
G02F 1/1335 (2006.01)

(52) U.S. Cl.
CPC .. *G02F 1/134336* (2013.01); *G02F 1/133512* (2013.01); *G02F 1/134309* (2013.01); *G02F 2001/134345* (2013.01)

(58) Field of Classification Search
CPC ......... G02F 1/134336; G02F 1/134309; G02F 1/133305; G02F 1/13439
See application file for complete search history.

(56) References Cited

U.S. PATENT DOCUMENTS

2004/0227703 A1    11/2004 Lamvik et al.
2013/0278488 A1    10/2013 Huo
2014/0231763 A1*    8/2014 Kim ................... H01L 27/3218
                                                              257/40

FOREIGN PATENT DOCUMENTS

CN    102645779 A    8/2012
CN    104007575 A    8/2014

* cited by examiner

*Primary Examiner* — Thanh-Nhan P Nguyen
(74) *Attorney, Agent, or Firm* — Faegre Baker Daniels LLP

(57) ABSTRACT

A planar display panel having a displaying effect of a curved screen and a display device. The sub-pixel pitches are sequentially increased in a direction departing from a central axis of the active display region in the display panel, so that the curved displaying effect is achieved by the planar display panel.

14 Claims, 11 Drawing Sheets

PLANAR DISPLAY PANEL AND DISPLAY DEVICE

CROSS-REFERENCE TO RELATED APPLICATION

This application claims priority to Chinese Application No. 201410857389.1, filed Dec. 30, 2014, which is herein incorporated by reference in its entirety.

BACKGROUND

Current curved displays available in the market, such as a curved television, are equipped with a curved screen, so that an equal distance from pixels on the curved screen to the eyes of an observer is achieved by the curved surface of the curved screen, thereby reproducing the real visual perception of the eyes vividly. Given an appropriate viewing position, parts of an object with a unit length displayed on a curved display can be viewed at the same visual angle. However, in the case of a planar display, parts of the same object with the unit length displayed on the planar display are viewed by an observer at different visual angles due to different positions of these parts of the object on the planar display.

Reference is made below to FIG. 1 which is a schematic view showing a curved display at a displaying state and FIG. 2 which is a schematic view showing a planar display at a displaying state. As shown in FIG. 1, when an observer is located at a position O which is the circle center of a curved surface of a curved display 1, line segments L1 and L2 displayed on the curved display 1, which have substantially the same length and are located at the same arc surface, are distanced from the position O of the observer by the same radius R, such that a visual angle θ1 corresponding to the line segment L1 viewed at the position O is identical to a visual angle θ2 corresponding to the segment L2 viewed at the position O, resulting in the same visual length of the line segments L1 and L2 observed by the observer, that is, the actual lengths of the line segments L1 and L2 can be properly reflected by the visual lengths through the curved display. However, as shown in FIG. 2, in the case of a planar display 2 having conventional arrangement of pixels, adjacent sub-pixels are spaced by the same sub-pixel pitch, resulting in an equidistant array arrangement of the sub-pixels. In this case, when the line segments b1 and b2 with the same length are displayed by the planar display 2, the line segments b1 and b2 are located on the same planar surface, thus a linear distance c1 between the line segment b1 and the position O of the observer is different from a linear distance c2 between the line segment b2 and the position O of the observer, so that a visual angle θ1 corresponding to the line segment b1 viewed at the position O is different from a visual angle θ2 corresponding to the line segment b2 viewed at the position O. Since visual dimensions of the two line segments L1 and L2 perceived by the observer's eyes are different, the lengths of the two line segments perceived by the observer are hence different. That is, line segments with the same length displayed on an ordinary planar display may correspond to different visual angles, and hence are perceived by the observer as line segments with different lengths, so that the actual proportion relationship between objects in the displayed image cannot be reflected accurately, causing a defect in reflecting the reality of the objects.

Despite providing a better displaying effect than the planar display, the curved display currently available in the market has a disadvantage of high manufacturing costs due to the difficulty in the process for manufacturing a Thin Film Transistor-Liquid Crystal Display (TFT-LCD) array substrate presenting the curved surface.

SUMMARY

In view of this, embodiments of the disclosure provide a planar display panel having a displaying effect of a curved screen and a display device.

According to exemplary embodiments of the disclosure, the disclosure provides a planar display panel, including an active display region containing a plurality of sub-pixels arranged in an array; the plurality of sub-pixels include first sub-pixels and second sub-pixels arranged alternately with the first sub-pixels; a distance between a center axis of the first sub-pixel in a first direction and a center axis of the second sub-pixel in the first direction is defined as a sub-pixel pitch; and the sub-pixel pitches are sequentially increased in a direction departing from a central axis of the active display region.

According to exemplary embodiments of the disclosure, the disclosure provides a display device including the display panel mentioned above.

According to the technical solution mentioned above, the disclosure provides a planar display panel having a displaying effect of a curved screen and a display device. The sub-pixel pitches are sequentially increased at both sides of the central axis of the active display region, so that the curved displaying effect is achieved by the planar display panel. The display panel can reproduce the real visual perception of the eyes vividly by non-equidistant arrangement of the sub-pixel pitches, thereby may have an advantage of low manufacture costs.

While multiple embodiments are disclosed, still other embodiments of the disclosure will become apparent to those skilled in the art from the following detailed description, which shows and describes illustrative embodiments of the disclosure. Accordingly, the drawings and detailed description are to be regarded as illustrative in nature and not restrictive.

BRIEF DESCRIPTION OF THE DRAWINGS

In order to more clearly illustrate technical solutions provided in embodiments of the disclosure, the accompanying drawings used for the description of the embodiments are briefly introduced below. Obviously, the drawings for the following description only show some embodiments of the disclosure.

Figure 1:
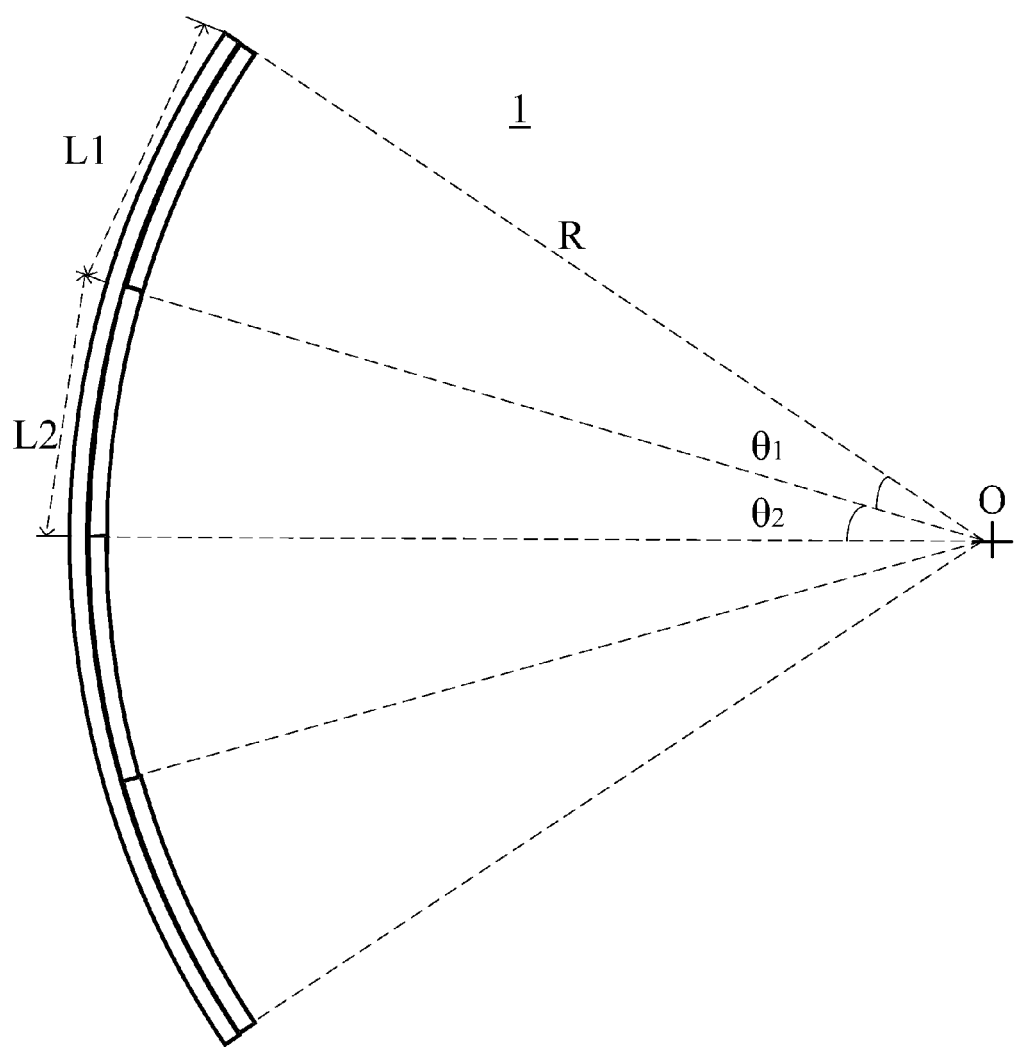
FIG. 1 is a schematic view showing a curved display at a displaying state in the related art.
Figure 2:
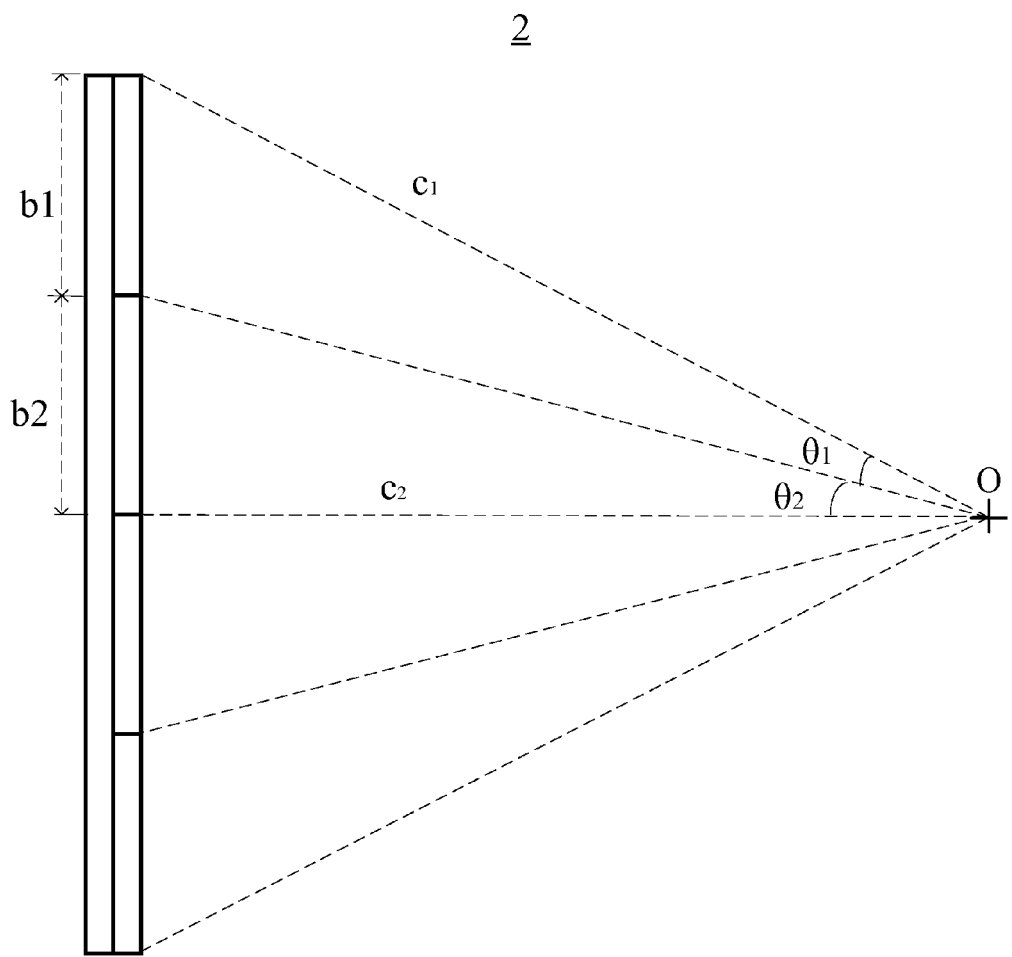
FIG. 2 is a schematic view showing a planar display at a displaying state in the related art.

While the disclosure is amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure as defined by the appended claims.

DETAILED DESCRIPTION

Technical solutions provided in embodiments of the disclosure will be described clearly in detail in combination with the accompanying drawings. It is apparent that only some embodiments but not all embodiments of the disclosure are described herein. Based on the embodiments of the disclosure, other embodiments fall in the scope of the disclosure.

The shape and size of each of the components shown in the accompanying drawings are not necessarily drawn to scale, and are intended for the purpose of clear and convenient description of embodiments of the disclosure.

Figure 3:
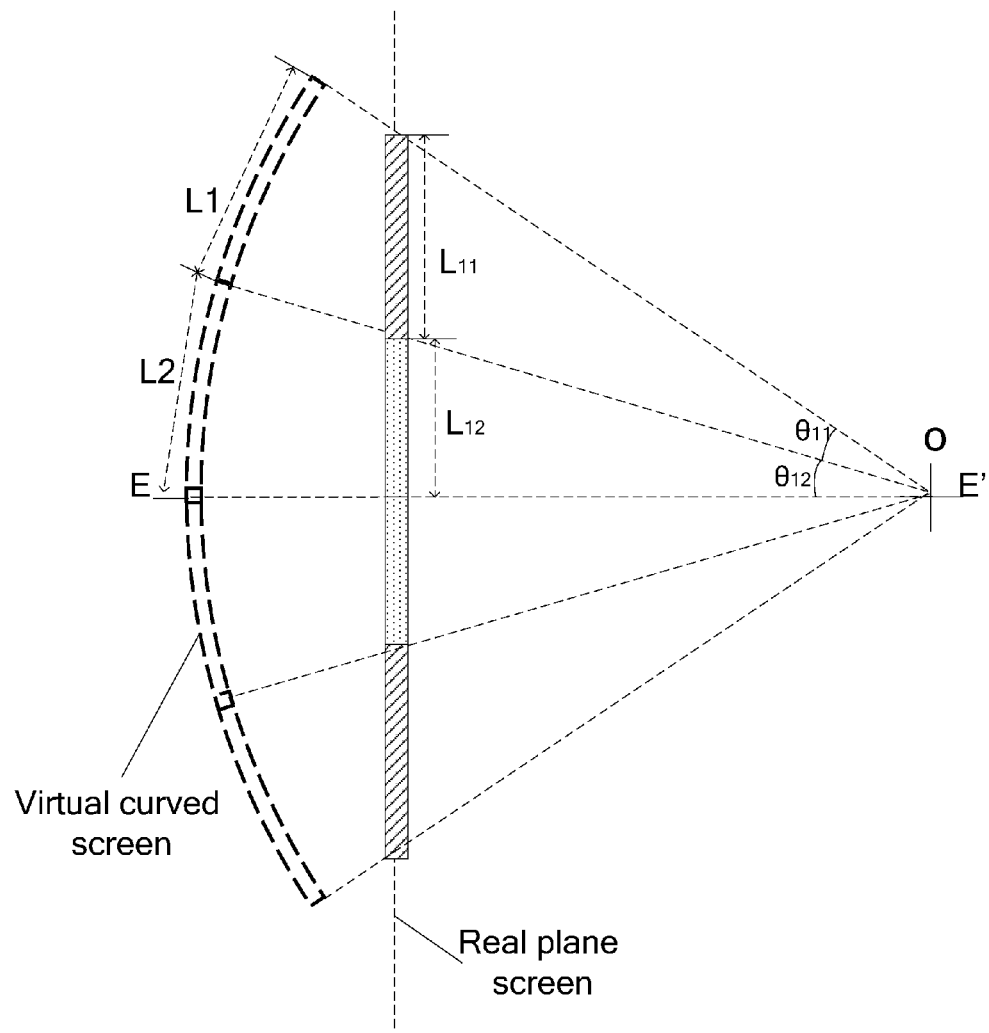
FIG. 3 is a schematic view showing a planar display panel having a curved-screen displaying effect according to embodiments of the disclosure.
Figure 4:
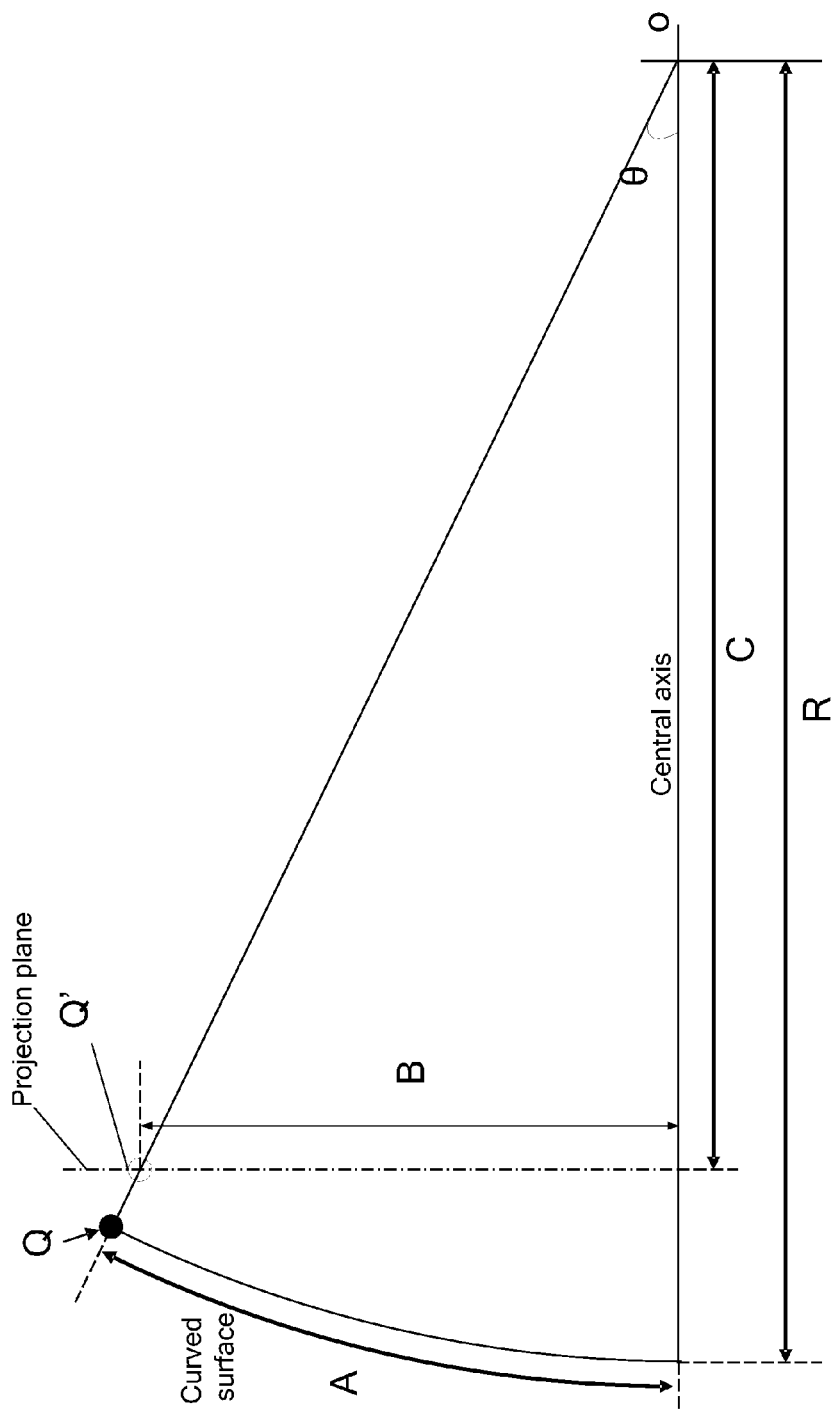
FIG. 4 shows a diagram of working principles by the planar display panel in FIG. 3.

As shown in FIGS. 3 and 4, in order to achieve a curved-screen displaying effect in a planar display panel, a conception of projection is employed in the present disclosure, where, arc segments with the same arc length are projected onto a plane screen as line segments with different lengths on the plane screen, but such line segments with different lengths on the plane screen correspond to the same visual angle from an observer, and hence are perceived as line segments with the same length by the observer. Specifically, as shown in FIG. 3 for example, arc segments L1 and L2 with the same arc length on a virtual curved screen respectively corresponds to a central angle θ11 and a central angle θ12 equal to the central angle θ11 with respect to the position O of the observer, and projecting the arc segments L1 and L2 onto a real plane screen obtains two line segments L11 and L12. At this time, the line segment L11 corresponds to the central angle θ11 and the line segment L12 corresponds to the central angle θ12 equal to the central angle θ11, with respect to the position O of the observer. For the line segments L11 and L12 obtained from the projection, the line segment L11 which is farther from a central axis EE' of the real plane screen may be elongated relative to the arc segment L1 on the virtual curved screen, and the line segment L12 which is closer to the central axis EE' of the real plane screen may be shortened relative to the arc segment L2 on the virtual curved screen. That is, the length of the line segment L11 is larger than that of the line segment L12 on the real plane screen. However, since the line segments L11 and L12 has the same size of central angle respectively, the lengths of the line segments L11 and L12 perceived by the observer from the position O are identical, so that the curved-screen displaying effect can be achieved.

As shown in FIG. 4, based on the projection conception mentioned above, the projection of an object displayed at a point Q on a curved surface onto a projection plane (e.g. the plane screen) is located at a position Q' on the projection plane. If the radius of the curved surface is represented by R, an observer is located at the position O, the linear distance from the position O to the projection plane is represented by C, and additionally the arc length from an intersection between a central axis of the projection plane and the curved surface to the point Q on the curved surface is represented by A, then a distance B from the position Q' of the projection of the object onto the projection plane to the central axis of the projection plane is calculated as follows:

$$B = C \cdot \tan\left(\frac{A}{R}\right) \quad (1)$$

Based on the projection conception mentioned above, the arrangement of the sub-pixels in the plane screen may be adjusted in such a way that sub-pixel pitches between the sub-pixels are adjusted so that the sub-pixel pitch between the sub-pixels which are farther away from the central axis of the plane screen is larger, thus an image displayed by the plane screen is somewhat deformed, thereby allowing the plane screen to show the displaying effect of a curved screen. It is should be noted that the sub-pixel pitch is specifically defined as a distance between respective center axis of two adjacently arranged sub-pixels in the same direction.

Figure 5:
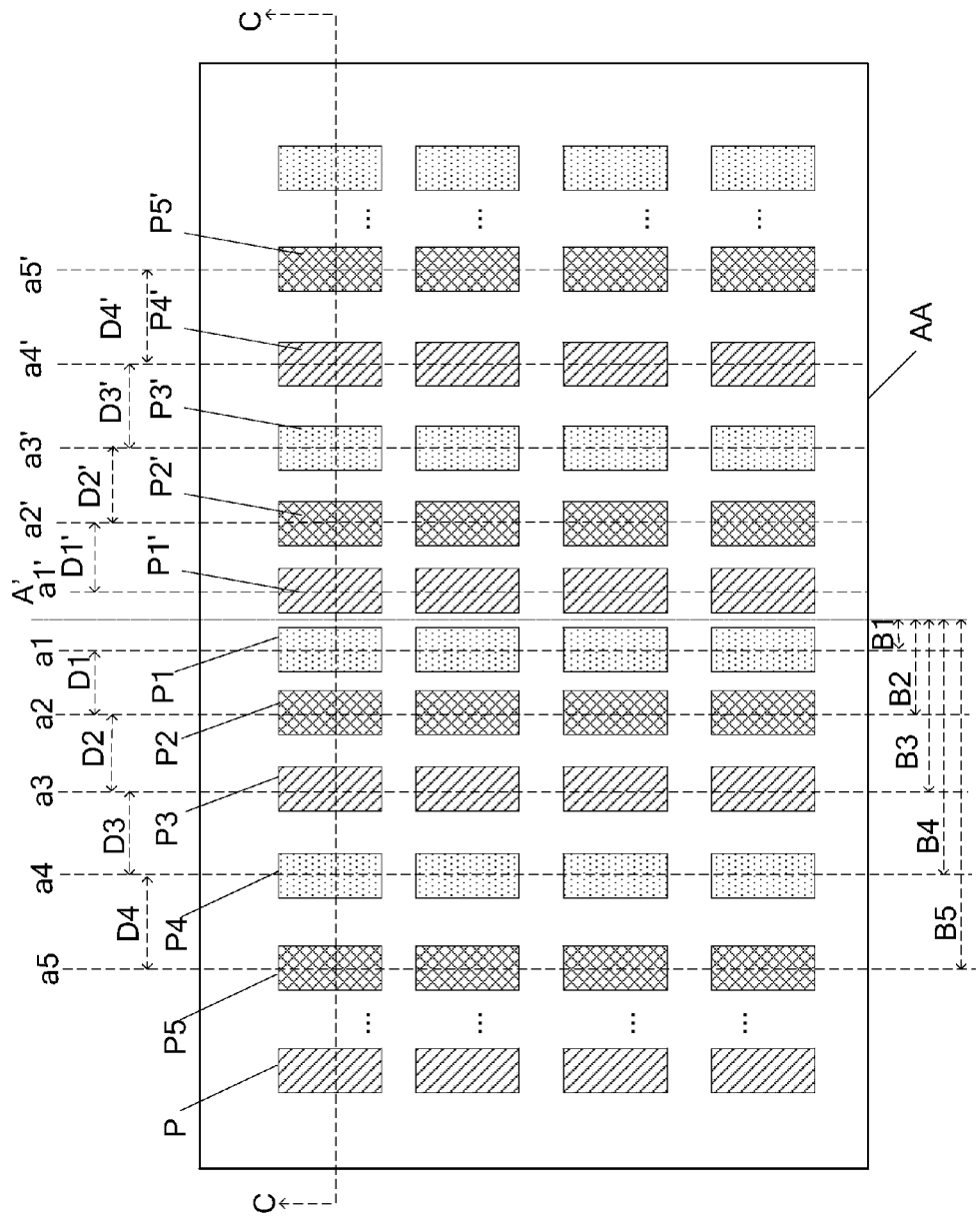
FIG. 5 is a schematic view showing another planar display panel according to embodiments of the disclosure.
Figure 8:
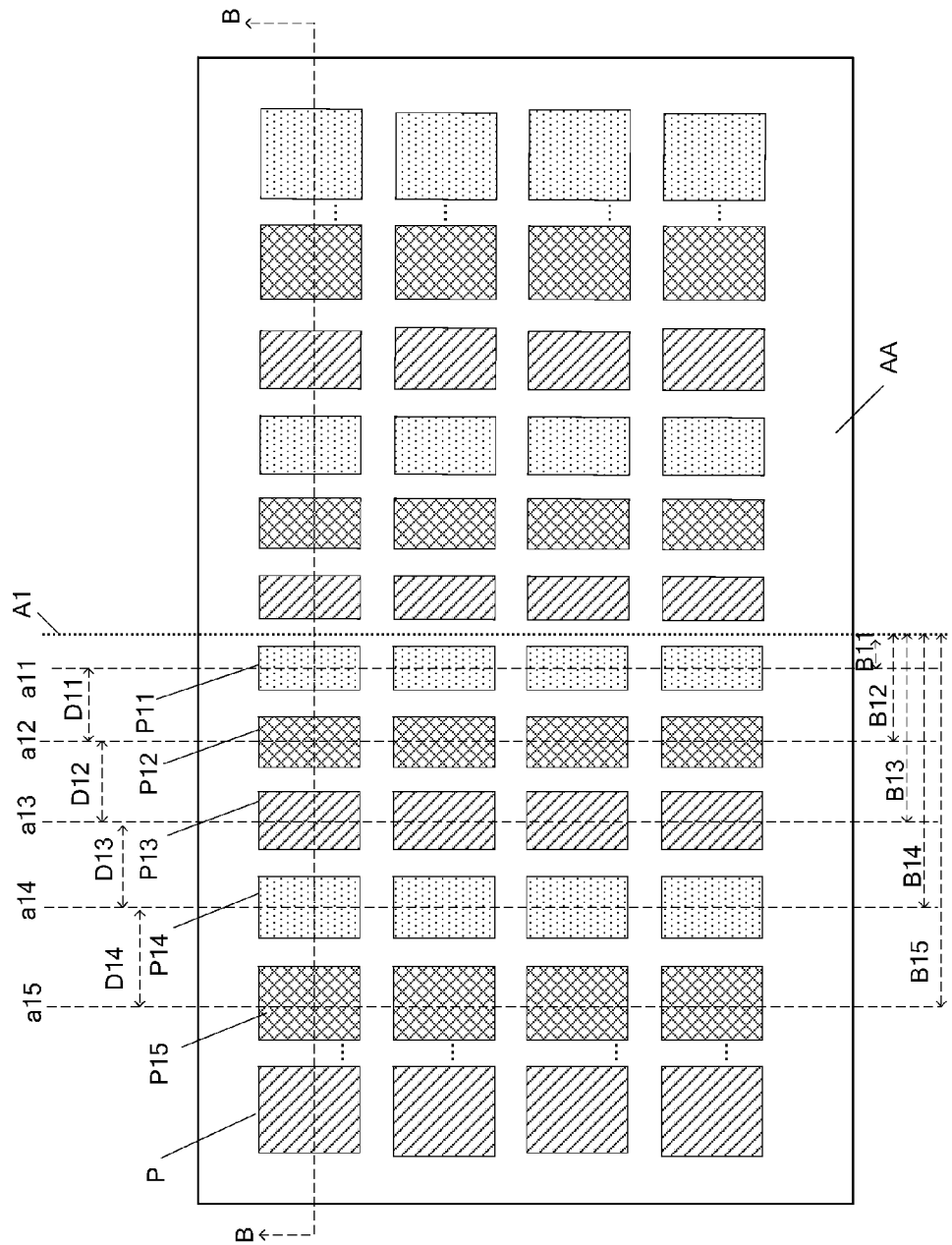
FIG. 8 is a schematic view showing still another planar display panel according to embodiments of the disclosure.

As shown in FIG. 5 and FIG. 8, embodiments of the disclosure provide a planar display panel, which has a rectangle or square shape. In embodiments of the disclosure, the planar display panel is illustratively described to have a rectangle shape, but the planar display panel may alternatively have a circle shape, an elliptic shape, and so on, which is not limited in the disclosure. The display panel includes an active display region AA containing a plurality of sub-pixels P arranged in an array.

Figure 6:
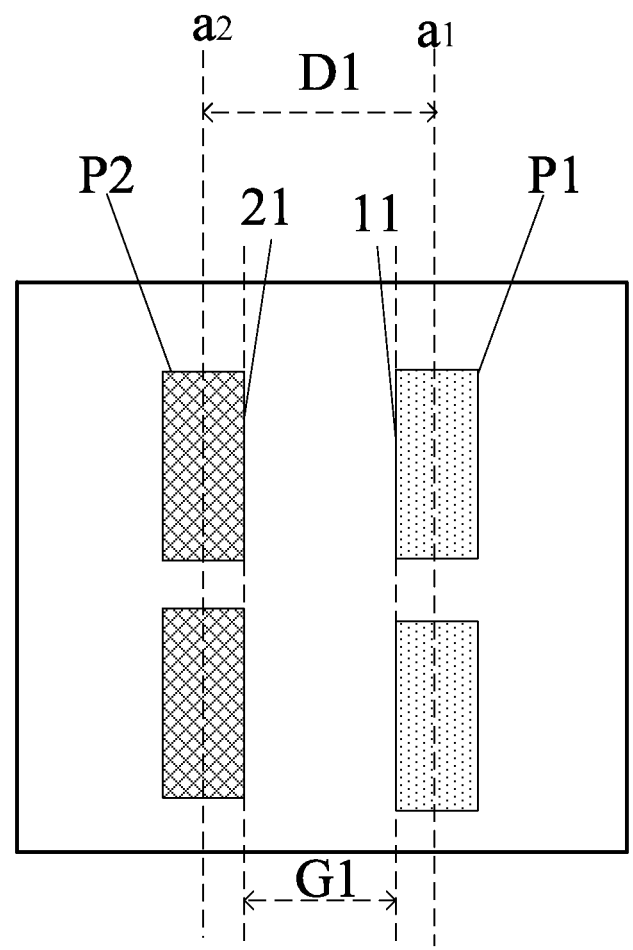
FIG. 6 is a partially enlarged view of FIG. 5.

As shown in FIG. 6, the plurality of sub-pixels P includes a first sub-pixel P1 and a second sub-pixel P2 arranged adjacent to the first sub-pixel P1. A distance between a center axis a1 of the first sub-pixel P1 in a first direction and a center axis a2 of the second sub-pixel P2 in the first direction is referred to as sub-pixel pitch D1; further referring to FIG. 5, the sub-pixel pitches D1, D2, D3 and D4 are sequentially increased in a direction departing from a central axis A' of the active display region AA. In addition, as shown in FIG. 5, the sub-pixels P at one side of the central axis A' of the active display region AA are arranged symmetrically with the sub-pixels P at the other side of the central axis A' with respect to the central axis A'.

The sub-pixel pitches are sequentially increased in a direction departing from the central axis of the active display region so that the displaying effect of the curved surface can be achieved on the planar display panel. In other words, a non-equidistant arrangement of the sub-pixels P is provided.

There are various implementations for the non-equidistant arrangement of the sub-pixels P, and some arrangement of the sub-pixels will be described in detail as follows.

Figure 7:
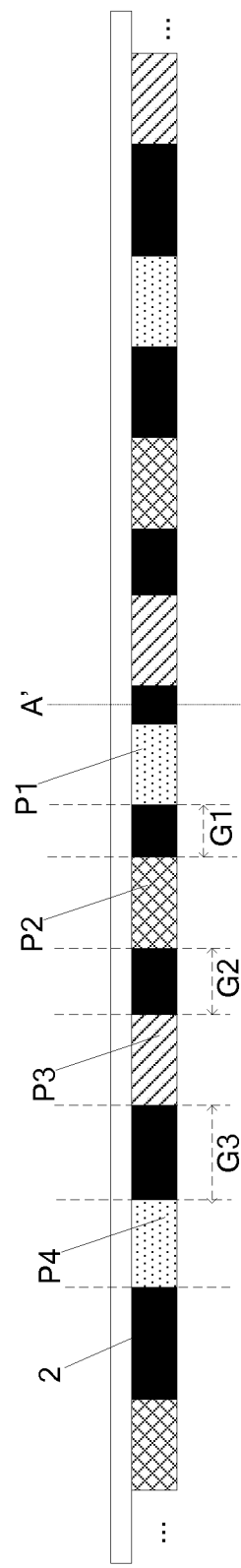
FIG. 7 is a schematic sectional diagram taken along a line CC in FIG. 5.

As shown in FIG. 5 to FIG. 7, FIG. 7 is a schematic sectional diagram taken along a line CC in FIG. 5. An implementation of the present disclosure provides a planar display panel, a first light shielding layer 2 is disposed between the first sub-pixel and the second sub-pixel, and the width of the first light shielding layer 2 is sequentially increased at both sides of the central axis A' of the active display region AA. However, all the sub-pixels in the active display region AA have the same opening area, that is, the sub-pixels have the same length and the same width.

The above planar display panel will be described in detail as follows.

FIG. 6 is a partially enlarged view of the plane display panel shown in FIG. 5. As shown in FIGS. 5 and 6, in a left half of an active display region AA of the planar display panel, a first sub-pixel P1, a second sub-pixel P2, a first sub-pixel P3, a second sub-pixel P4, a first sub-pixel P5, . . . , and a first sub-pixel Pn (not shown) sequentially adjacent to one another are arranged at a left side of the central axis A' of the active display region AA. For the purpose of describing the conception of the disclosure, the arrangement of only the above five sub-pixels P1, P2, P3, P4 and P5 are illustratively described below, but the disclosure is not limited thereto. As shown in FIG. 6, a sub-pixel pitch D1 between the first sub-pixel P1 and the second sub-pixel P2 refers to a distance between a center axis a1 of the first sub-pixel P1 in a first direction and a center axis a2 of the second sub-pixel P2 in the first direction; also, as shown in FIG. 5, a sub-pixel pitch D2 between the second sub-pixel P2 and the first sub-pixel P3 refers to a distance between the center axis a2 of the second sub-pixel P2 in the first direction and a center axis a3 of the first sub-pixel P3 in the first direction, wherein a second direction being perpendicular to the first direction, the sub-pixel pitch D2 is larger than the sub-pixel pitch D1; also, a sub-pixel pitch D3 between the first sub-pixel P3 and the second sub-pixel P4 refers to a distance between the center axis a3 of the first sub-pixel P3 in the first direction and a center axis a4 of the second sub-pixel P4 in the first direction, wherein the second direction being perpendicular to the first direction, the sub-pixel pitch D3 is larger than the sub-pixel pitch D2; also, a sub-pixel pitch D4 between the second sub-pixel P4 and the first sub-pixel P5 refer to a distance between the center axis a4 of the second sub-pixel P4 in the first direction and a center axis a5 of the first sub-pixel P5 in the first direction, wherein the second direction perpendicular to the first direction, the sub-pixel pitch D4 is larger than the sub-pixel pitch D3, and so on; so that in such arrangement, the sub-pixel pitch between two adjacent sub-pixels which are farther away from the central axis A' is larger. Assuming that a sub-pixel pitch between two adjacent sub-pixels Pn-1 and Pn at the left-most edge of the active display region AA is represented by Dm, the size relationship of the sub-pixel pitches D1, D2, . . . , Dm toward the second direction departing from the central axis A' of the active display region AA in the left half of the active display region AA is represented as $D1<D2<D3<D4<. . .<Dm$, where m is a positive integer and represents the amount of rows or columns of the sub-pixels at one side of the central axis A'.

Also referring to FIG. 5, the arrangement in a right half of the active display region is the same to that in the left half of the active display region. In the right half portion of the active display region AA, a first sub-pixel P1', a second sub-pixel P2', a first sub-pixel P3', a second sub-pixel P4', a first sub-pixel P5', . . . , a first sub-pixel Pn' are symmetrically with the first sub-pixel P1, the second sub-pixel P2, a first sub-pixel P3, the second sub-pixel P4, the first sub-pixel P5, . . . the first sub-pixel Pn (not shown in FIG. 6) respectively with respect to the central axis A'. As shown in FIG. 5, a sub-pixel pitch D1' between the first sub-pixel P1' and the second sub-pixel P2' refers to a distance between center axis a1' of the first sub-pixel P1' in a first direction and a center axis a2' of the second sub-pixel P2' in the first direction; as shown in FIG. 5, a sub-pixel pitch D2' between the second sub-pixel P2' and the first sub-pixel P3' refers to a distance between the center axis a2' of the second sub-pixel P2' in the first direction and a center axis a3' of the first sub-pixel P3' in the first direction; as shown in FIG. 5, a sub-pixel pitch D3' between the first sub-pixel P3' and the second sub-pixel P4' refers to a distance between the center axis a3' of the first sub-pixel P3' in the first direction and a center axis a4' of the second sub-pixel P4' in the first direction; as shown in FIG. 5, a sub-pixel pitch D4' between the second sub-pixel P4' and the first sub-pixel P5' refers to a distance between the center axis a4' of the second sub-pixel P4' in the first direction and a center axis a5' of the first sub-pixel P5' in the first direction. As shown in FIG. 5, in such arrangement, the sub-pixel pitch between two adjacent sub-pixels which are farther away from the central axis A' is larger. Assuming that a sub-pixel pitch between two adjacent sub-pixels Pn-1' and Pn' at the right-most edge of the active display region is represented by Dm', the size relationship of the sub-pixel pitches D1, D2, . . . , Dm toward the second direction departing from the central axis A' of the active display region AA in the right half of the active display region AA is represented as $D1'<D2'<D3'<D4'<. . .<Dm'$, where m' is a is a positive integer and represents the amount of rows or columns of the sub-pixels at one side of the central axis A'. Since the sub-pixels P are symmetrically with respect to the central axis A' , the size relationship of the sub-pixel pitches D1, D2, . . . , Dm toward the second direction departing from the central axis A' of the active display region AA in the left half of the active display region AA and the sub-pixel pitches D1', D2', . . . , Dm' toward the second direction departing from the central axis A' of the active display region AA in the right half of the active display region AA is presented as D1=D1', D2=D2', D3=D3', D4=D4', . . . ,and Dm=Dm'.

In some embodiments of the disclosure, the non-equidistant arrangement of the first sub-pixel and the second sub-pixel is achieved by adjusting the width of the first light shielding layer 2 disposed between the first sub-pixel and the second sub-pixel, which will be described in detail below.

As shown in FIG. 6, a first side 11 of the first sub-pixel P1 is spaced from a second side 21 of the second sub-pixel P2 by a first predetermined distance G1, where the first side 11 of the first sub-pixel P1 is close to the second sub-pixel P2, and the second side 21 of the second sub-pixel P2 is close to the first sub-pixel P1. The first predetermined distance is larger than or equal to 15 μm, and more particularly, the first predetermined distance is in a range of 15 μm to 400 μm. In addition, the first side 11 and the second side 21 extend in the same direction. As shown in FIG. 7, in some embodiments, a first light shielding layer 2, which generally is a black matrix, is disposed between the first sub-pixel and the second sub-pixel for the purpose of avoiding color mixing of and light leakage phenomena between the sub-pixels P. The first predetermined distance refers to the width of the first light shielding layer 2, and thus the width of the first light shielding layer 2 is also larger than or equal to 15 μm, and more particularly is in a range of 15 μm to 400 μm. Since the sub-pixels have the same opening area, the first predetermined distances are sequentially increased in a direction departing from the central axis A' of the active display region AA.

Also referring to FIGS. 6 and 7, the width of the first light shielding layer 2 between the first sub-pixel P1 and the second sub-pixel P2 is defined as the first predetermined distance G1; the width of the first light shielding layer 2 between the second sub-pixel P2 and the first sub-pixel P3 is defined as a first predetermined distance G2, where the first predetermined distance G2 is larger than the first predetermined distance G1; also, the width of the first light shielding layer 2 between the first sub-pixel P3 and the second sub-pixel P4 is defined as a first predetermined distance G3, where the first predetermined distance G3 is larger than the first predetermined distance G2; as shown in FIG. 7, so that in such arrangement, the first predetermined distance or the width of the first light shielding layer 2 between two adjacent sub-pixels which are farther away from the central axis A' is larger. Assuming that a first predetermined distance between two adjacent sub-pixels Pn-1 and Pn at the left-most edge of the active display region AA is represented by Gm, the size relationship of the first predetermined distance G1, G2, . . . , Gm or the width of the first light shielding layer 2 departing from the central axis A' of the active display region AA in the left half of the active display region AA is represented as G1<G2<G3<. . .<Dm, the first predetermined distance or the width of the first light shielding layer 2 is in a range of 15 μm to 400 μm, where m is a is a positive integer and represents the amount of rows or columns of the sub-pixels at one side of the central axis A'.

Also referring to FIG. 7, the first predetermined distance and the width of the light shielding layer disposed between the sub-pixels at the right half of the active display region are similarly designed as the first predetermined distance and the width of the light shielding layer disposed between the sub-pixels at the left half of the active display region, and will not be described repeatedly herein.

Since the sub-pixel pitches are sequentially increased in directions departing from the two sides of the central axis A' of the active display region AA, the distances from the center axis of the sub-pixels at either of the two sides of the central axis A' of the active display region AA to the central axis A' are also sequentially increased. As shown in FIG. 5, a distance from a center axis a1 of a first sub-pixel P1 in a first direction to a central axis A' is referred to as a second predetermined distance B1; a distance from a center axis a2 of a second sub-pixel P2 in the first direction to the central axis A' is referred to as a second predetermined distance B2; a distance from a center axis a3 of a first sub-pixel P3 in the first direction to the central axis A' is referred to as a second predetermined distance B3; a distance from the center axis a4 of a second sub-pixel P4 in the first direction to the central axis A' is referred to as a second predetermined distance B4; a distance from a center axis a5 of a first sub-pixel P5 in the first direction to the central axis A' is referred to as a second predetermined distance B5; . . . ; a distance from a center axis an of a first sub-pixel Pn in the first direction to the central axis A' is referred to as a second predetermined distance Bm. The size relationship of the second predetermined distance B1, B2, B3, B4, B5, . . . , Bm toward second direction departing from the central axis A' of the active display region AA in the left half of the active display region AA is represented as B1<B2<B3<B4<B5 . . .<Bm, where m is a is a positive integer and represents the amount of rows or columns of the sub-pixels at one side of the central axis A'. For example, in the case that a distance from a center axis a5 of a first sub-pixel P5 in the first direction to the central axis A' is referred to as a second predetermined distance B5, m is equal to 5, that is, the first sub-pixels P5 in a row arrangement include the fifth row of first sub-pixels at the left side of the central axis A'. It is noted that in some embodiments and the Figures, the arrangement manner of the sub-pixels is illustratively described as a row arrangement, but the disclosure is not limited thereto. The column arrangement of the sub-pixels taking is also possible.

Also referring to FIG. 7, the distances from the center axis of the sub-pixels at the right half of the active display region AA to the central axis A' are also sequentially increased, which will not be described herein.

The second predetermined distance Bm from the center axis of the sub-pixel P in the first direction to the central axis A' is calculated as follows:

$$B_m = C' \cdot \tan\left[\frac{(n-0.5) \times A_0}{R'}\right], m = 1, 2, 3, \ldots. \quad (2)$$

The sub-pixel pitch Dm (in a second direction perpendicular to the first direction) between the first sub-pixel and the second sub-pixel is calculated as follows:

$$D_m = B_{m+1} - B_m = C' \cdot \tan\left[\frac{(n+0.5) \times A_0}{R'}\right] - C' \cdot \tan\left[\frac{(n-0.5) \times A_0}{R'}\right], \quad (3)$$
$$m = 1, 2, 3, \ldots$$

where, in the equations (2) and (3), $A_0$ represents the sub-pixel pitch between two sub-pixels respectively at two sides of the central axis of the active display region that are closest to the central axis of the active display region. In some embodiments, $A_0$ represents a distance between a center axis a1 of the first sub-pixel P1 and a center axis a1' of the second sub-pixel P1'; C' represents the shortest linear distance from a position of an observer to the planar display panel, and as such, C' may be considered as a linear distance C from the position O of the observer to the projection plane as shown in FIG. 4; R' represents a linear distance from a viewing position to a row or column of sub-pixels at the active display region AA in the planar display panel which is furthest away from the central axis of the active display region AA, and as such, R' may be considered as a linear distance from the position O of the observer to the point Q' as shown in FIG. 4; and m is a positive integer and represents the amounts of the rows or columns of the sub-pixels located at one side of the central axis of the active display region.

Figure 9:
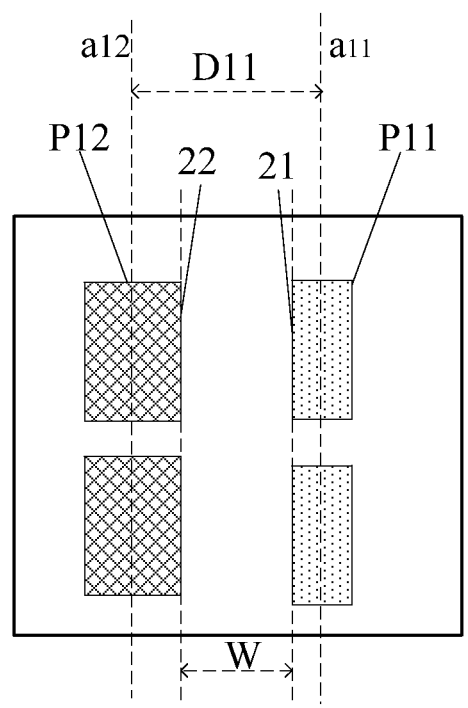
FIG. 9 is a partially enlarged view of FIG. 8.
Figure 10:
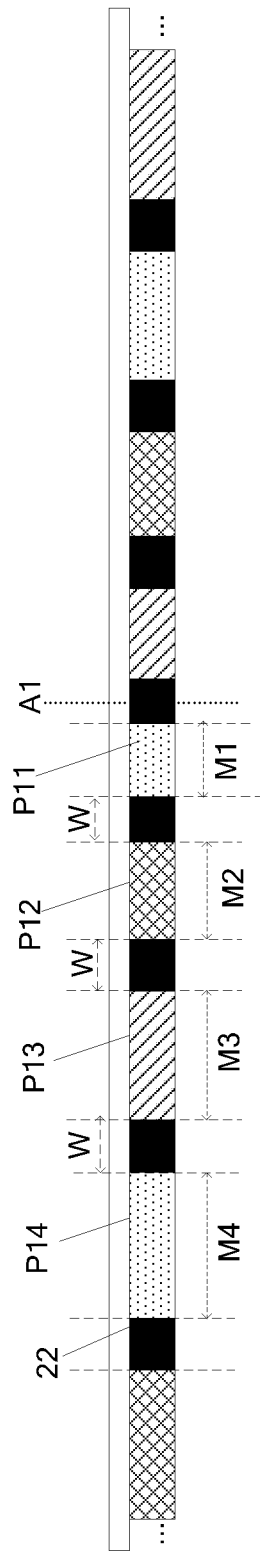
FIG. 10 is a schematic sectional diagram taken along a line BB in FIG. 8.

Based on the above embodiments, the disclosure provides another planar display panel, as shown in FIGS. 8-10, where FIG. 10 is a schematic sectional diagram taken along a line BB in FIG. 8. In some embodiments, the width of a first light shielding layer 22 disposed between the first sub-pixel and the second sub-pixel has a constant value, that is, the first predetermined distance between the first sub-pixel and the second sub-pixel is fixed. Instead, the opening areas of the sub-pixels are sequentially increased in a direction departing from the central axis A1 of the active display region AA.

FIG. 9 is a partially enlarged view of the plane display panel shown in FIG. 8. As shown in FIGS. 8 and 9, in a left half of an active display region AA of the planar display panel, a first sub-pixel P11, a second sub-pixel P12, a first sub-pixel P13, a second sub-pixel P14, a first sub-pixel P15, . . . , and a first sub-pixel P1n (not shown) sequentially adjacent to one another are arranged at a left side of the central axis A1 of the active display region AA. For the purpose of describing the conception of the disclosure, the arrangement of only the above five sub-pixels P11, P12, P13, P14 and P15 are illustratively described below, but the disclosure is not limited thereto. As shown in FIG. 9, a sub-pixel pitch D11 between the first sub-pixel P11 and the second sub-pixel P12 refers to a distance between a center axis a11 of the first sub-pixel P11 in a first direction and a center axis a12 of the second sub-pixel P12 in the first direction; as shown in FIG. 8, a sub-pixel pitch D12 between the second sub-pixel P12 and the first sub-pixel P13 refers to a distance between the center axis a12 of the second sub-pixel P12 in the first direction and a center axis a13 of the first sub-pixel P13 in the first direction, as shown in FIG. 8, a sub-pixel pitch D13 between the first sub-pixel P13 and the second sub-pixel P14 refers to a distance between a center axis a13 of the first sub-pixel P13 in a first direction and a center axis a14 of the second sub-pixel P14 in the first direction; a sub-pixel pitch D14 between the second sub-pixel P14 and the first sub-pixel P15 refers to a distance between a center axis a14 of the second sub-pixel P14 in a first direction and a center axis a15 of the first sub-pixel P15 in the first direction. As shown in FIG. 8, in such arrangement, the sub-pixel pitch between two adjacent sub-pixels which are farther away from the central axis A1 is larger. Assuming that a sub-pixel pitch between two adjacent sub-pixels Pn-1 and Pn (not shown) at the left-most edge of the active display region AA is represented by D1m, the size relationship of the sub-pixel pitches D11, D12, . . . , D1m toward the second direction departing from the central axis A' of the active display region AA in the left half of the active display region AA is represented as D11<D12<D13<D14<. . .<D1m, where m is a is a positive integer and represents the amount of rows or columns of the sub-pixels at one side of the central axis A'.

In some embodiments, the opening area of the sub-pixel is configured so that the opening areas of the sub-pixels are sequentially increased in a direction departing from the central axis A1 of the active display region AA, thereby realizing the non-equidistant arrangement of the sub-pixels.

As shown in FIGS. 9 and 10, a first predetermined distance W is disposed between a first side 21 of the first sub-pixel P11 close to the second sub-pixel P12 and a second side 22 of the second sub-pixel P12 close to the first sub-pixel P11, and is fixed as the width of the second light shielding layer 22 between the first sub-pixel P11 and the second sub-pixel P12. In other words, the width of the second light shielding layer 22 between any two adjacent sub-pixels remains unchanged.

Also referring to FIGS. 8 and 10, specifically, the first sub-pixel P11 has a first width M1 in the second direction perpendicular to the first direction; the second sub-pixel P12 has a first width M2 in the second direction; the first sub-pixel P13 has a first width M3 in the second direction; the second sub-pixel P14 has a first width M4 in the second direction; . . . , the first sub-pixel P1n at the left-most edge of a left half of the active display region AA (not shown) has a first width M1m. In such arrangement, the relationship of the first width of the sub-pixel in the second direction toward the second direction departing from the central axis A1 of the active display region AA in the left half of the active display region AA is represented as M1<M2<M3<. . .<D1m, where m is a positive integer and represents the amount of rows or columns of the sub-pixels at one side of the central axis A', where the first width is larger than or equal to 15 µm, and the first width is in a range of 15 µm to 400 µm.; where m is a positive integer and represents the amount of rows or columns of the sub-pixels at one side of the central axis A'. In addition, all the sub-pixels have the same length, and thus the opening areas of the sub-pixels P are sequentially increased in a direction departing from the central axis A1 of the active display region AA.

Also referring to FIGS. 8 and 10, since the first widths of the sub-pixels P in the second direction are sequentially increased in directions departing from the two sides of the central axis A1 of the active display region AA, the distances from the center axis of the sub-pixels at either of the two sides of the central axis A1 of the active display region AA to the central axis A1 are also sequentially increased. As shown in FIG. 8, a distance from a center axis a11 of a first sub-pixel P11 in a first direction to a central axis A1 is referred to as a second predetermined distance B11; a distance from a center axis a12 of a second sub-pixel P12 in the first direction to the central axis A1 is referred to as a second predetermined distance B12; a distance from a center axis a13 of a first sub-pixel P13 in the first direction to the central axis A1 is referred to as a second predetermined distance B13; a distance from the center axis a14 of a second sub-pixel P14 in the first direction to the central axis A1 is referred to as a second predetermined distance B14; a distance from a center axis a15 of a first sub-pixel P15 in the first direction to the central axis A1 is referred to as a second predetermined distance B15; . . . ; a distance from a center axis a1n of a first sub-pixel P1n in the first direction to the central axis A1 is referred to as a second predetermined distance B1m. The size relationship of the second predetermined distance B11, B12, B13, B14, . . . , B1m toward second direction departing from the central axis A1 of the active display region AA in the left half of the active display region AA is represented as B11<B12<B13<B14 . . .<B1m, where m is a is a positive integer and represents the amount of rows or columns of the sub-pixels at one side of the central axis A'.

The arrangement of the sub-pixels in the right half of the active display region AA is similar to the arrangement of the sub-pixels in the left half of the active display region. The sub-pixels P are respectively symmetric with the sub-pixels at the left side of the central axis A' with respect to the central axis A', and will not be described repeatedly herein.

The sub-pixel pitch D1m (in a second direction perpendicular to the first direction) between the first sub-pixel and the second sub-pixel is calculated as follows:

$$D_{1m} = B_{1(m+1)} - B_m = \qquad (4)$$
$$C' \cdot \tan\left[\frac{(n+0.5) \times A_0}{R'}\right] - C' \cdot \tan\left[\frac{(n-0.5) \times A_0}{R'}\right], m = 1, 2, 3, \ldots$$

Since the first predetermined distance W in the second direction perpendicular to the first direction between the first sub-pixel and the second sub-pixel is a constant value, the first width M of the sub-pixel in the second direction is calculated as follows:

$$M_m = D_{1m} - W = C' \cdot \left\{\tan\left[\frac{(n+0.5) \times A_0}{R'}\right] - \tan\left[\frac{(n-0.5) \times A_0}{R'}\right]\right\} - W, \qquad (5)$$
$$m = 1, 2, 3, \ldots$$

where, in the equations (4) and (5), $A_O$ represents the sub-pixel pitch between two sub-pixels respectively at two sides of the central axis A1 of the active display region AA that are closest to the central axis A1 of the active display region AA. C' represents the shortest linear distance from a position of an observer to the planar display panel, and as such, C' may be considered as a linear distance C from the position O of the observer to the projection plane as shown in FIG. 4; R' represents a linear distance from a viewing position to a row or column of sub-pixels at the active display region AA in the planar display panel which is furthest away from the central axis of the active display region AA, and as such, R' may be considered as a linear distance from the position O of the observer to the point Q' as shown in FIG. 4; W is a first predetermined distance between the first sub-pixels and the second sub-pixels in the section direction and m is a positive integer and represents the amounts of the rows or columns of the sub-pixels located at one side of the central axis of the active display region.

Figure 11:
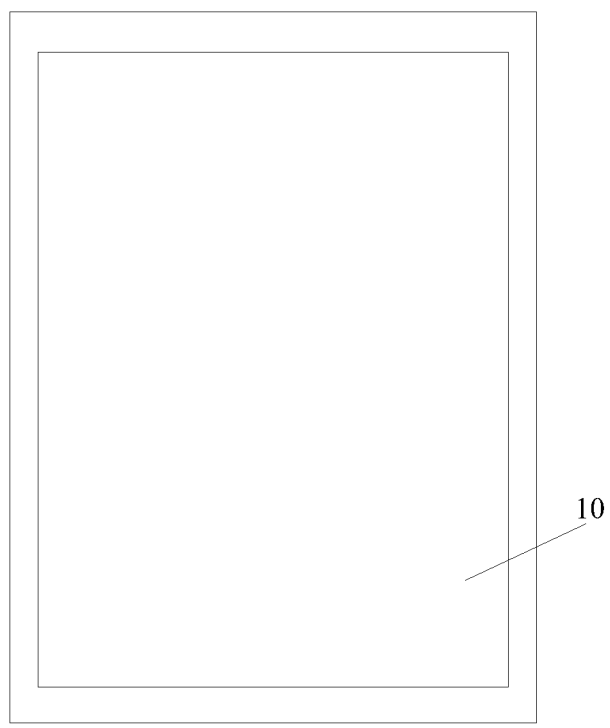
FIG. 11 is a schematic view showing a display device according to embodiments of the disclosure.

As shown in FIG. 11, the disclosure also provides a display device 100 with the displaying effect of a curved screen, and the display device 100 includes a display panel 10 which may be any one of the plane display panels mentioned above. The display device 10 may be any products or parts having a displaying function, such as a phone, a tablet computer, a TV set, a display, a laptop computer, a digital camera, and a navigation device. The embodiments of the display device can refer to the embodiments of the planar display panel mentioned above, which will not be described herein.

The embodiments in the disclosure are described in a progressive manner, the description of each of the subsequent embodiments focuses on differences of these embodiments from other embodiments, and the same parts or the similar parts of the embodiments can refer to each other.

The general principles in the disclosure can be realized in other embodiments without departing from the spirit and the scope of the disclosure. Therefore, the embodiments are not intended to limit the disclosure but to provide a wider scope in accordance with the principles in the disclosure.

Various modifications and additions can be made to the exemplary embodiments discussed without departing from the scope of the disclosure. For example, while the embodiments described above refer to particular features, the scope of the disclosure also includes embodiments having different combinations of features and embodiments that do not include all of the described features. Accordingly, the scope of the disclosure is intended to embrace all such alternatives, modifications, and variations as fall within the scope of the claims, together with all equivalents thereof.

I claim:

1. A planar display panel, comprising:
an active display region comprising a plurality of sub-pixels arranged in an array;
wherein the plurality of sub-pixels comprise first sub-pixels and second sub-pixels arranged alternately with the first sub-pixels;
a distance between a center axis of the first sub-pixel in a first direction and a center axis of the second sub-pixel in the first direction is defined as a sub-pixel pitch; and
the sub-pixel pitches are sequentially increased in a direction departing from a central axis of the active display region,
wherein, a first side close to the second sub-pixel of the first sub-pixel, is spaced from a second side close to the first sub-pixel of the second sub-pixel, by a first predetermined distance, and the first side of the first sub-pixel and the second side of the second sub-pixel extend along a same direction,
wherein the plurality of the sub-pixels have a same opening area, and the first predetermined distances are sequentially increased in a direction departing from the central axis of the active display region,
wherein the plurality of the sub-pixels have a same length and a same width, and the first predetermined distance is larger than or equal to 15 μm, and
wherein a first light shielding layer is disposed between the first sub-pixel and the second sub-pixel, and a width of the first light shielding layer in a second direction perpendicular to the first direction is larger than or equal to 15 μm.

2. The planar display panel of claim 1, wherein, the planar display panel has a rectangle shape or a square shape, and the sub-pixel pitches are sequentially increased at both sides of the central axis of the active display region.

3. The planar display panel of claim 1, wherein, the sub-pixel pitch between the first sub-pixel and the second sub-pixel in the second direction is calculated as:

$$D_m = B_{m+1} - B_m = C' \cdot \tan\left[\frac{(n+0.5) \times A_0}{R'}\right] - C' \cdot \tan\left[\frac{(n-0.5) \times A_0}{R'}\right],$$

$$m = 1, 2, 3, \ldots$$

wherein $A_0$ represents the sub-pixel pitch between the two sub-pixels respectively closest to the central axis of the active display region; C' represents a shortest linear distance from a position of an observer to the planar display panel; R' represents a linear distance from the position of the observer to a row or column of sub-pixels in the active display region of the planar display panel, wherein, the row or column of the sub-pixels in the active display region of the planar display panel is furthest away from the central axis of the active display region; and m is a positive integer and represents the amounts of the rows or columns of the sub-pixels located at one side of the central axis of the active display region.

4. The planar display panel of claim 1, wherein the first predetermined distance has a constant value, and opening areas of the sub-pixels are sequentially increased in a direction departing from the central axis of the active display region.

5. The planar display panel of claim 4, wherein the sub-pixel has a first width in a second direction perpendicular to the first direction, and the first widths are sequentially increased in a direction departing from the central axis of the active display region.

6. The planar display panel of claim 5, wherein the first width of the sub-pixel is larger than or equal to 15 μm.

7. The planar display panel of claim 6, wherein a second light shielding layer is disposed between the first sub-pixel and the second sub-pixel, and a width of the second light shielding layer in the second direction has a constant value.

8. The planar display panel of claim 7, wherein the first width of the sub-pixel is calculated as:

$$M_m = D_{1m} - W = C' \cdot \left\{\tan\left[\frac{(n+0.5) \times A_0}{R'}\right] - \tan\left[\frac{(n-0.5) \times A_0}{R'}\right]\right\} - W,$$

$$m = 1, 2, 3, \ldots$$

wherein $A_0$ represents the sub-pixel pitch between the two sub-pixels respectively closest to the central axis of the active display region; C' represents a shortest linear distance from a position of an observer to the planar display panel; R' represents a linear distance from the position of the observer to a row or column of sub-pixels in the active display region of the planar display panel, wherein, the row or column of the sub-pixels in the active display region of the planar display panel is furthest away from the central axis of the active display region; W represents a first predetermined distance between the first sub-pixel and the second sub-pixel in the second direction and m is a positive integer and represents the amounts of the rows or columns of the sub-pixels located at one side of the central axis of the active display region.

9. A display device, comprising a planar display panel, the planar display panel comprises:

an active display region comprising a plurality of sub-pixels arranged in an array;

wherein the plurality of sub-pixels comprise first sub-pixels and second sub-pixels arranged alternately with the first sub-pixels;

a distance between a center axis of the first sub-pixel in a first direction and a center axis of the second sub-pixel in the first direction is defined as a sub-pixel pitch; and the sub-pixel pitches are sequentially increased in a direction departing from a central axis of the active display region, wherein, a first side close to the second sub-pixel of the first sub-pixel, is spaced from a second side close to the first sub-pixel of the second sub-pixel, by a first predetermined distance, and the first side of the first sub-pixel and the second side of the second sub-pixel extend along a same direction, wherein the plurality of the sub-pixels have a same opening area, and the first predetermined distances are sequentially increased in a direction departing from the central axis of the active display region, wherein the plurality of the sub-pixels have a same length and a same width, and the first predetermined distance is larger than or equal to 15 μm, and wherein a first light shielding layer is disposed between the first sub-pixel and the second sub-pixel, and a width of the first light shielding layer in a second direction perpendicular to the first direction is larger than or equal to 15 μm.

10. The display device of claim 9, wherein, the planar display panel has a rectangle shape or a square shape, and the sub-pixel pitches are sequentially increased at both sides of the central axis of the active display region.

11. The display device of claim 9, wherein, the sub-pixel pitch between the first sub-pixel and the second sub-pixel in a second direction perpendicular to the first direction is calculated as:

$$D_m = B_{m+1} - B_m = C' \cdot \tan\left[\frac{(n+0.5) \times A_0}{R'}\right] - C' \cdot \tan\left[\frac{(n-0.5) \times A_0}{R'}\right],$$

$$m = 1, 2, 3, \ldots$$

wherein $A_0$ represents the sub-pixel pitch between the two sub-pixels respectively closest to the central axis of the active display region; C' represents a shortest linear distance from a position of an observer to the planar display panel; R' represents a linear distance from the position of the observer to a row or column of sub-pixels in the active display region of the planar display panel, wherein, the row or column of the sub-pixels in the active display region of the planar display panel is furthest away from the central axis of the active display region; and m is a positive integer and represents the amounts of the rows or columns of the sub-pixels located at one side of the central axis of the active display region.

12. The display device of claim 9, wherein the first predetermined distance has a constant value, and opening areas of the sub-pixels are sequentially increased in a direction departing from the central axis of the active display region.

13. The display device of claim 12, wherein the sub-pixel has a first width in a-second direction perpendicular to the first direction, and the first widths are sequentially increased in a direction departing from the central axis of the active display region.

14. The display device of claim 13, wherein the first width of the sub-pixel is calculated as:

$$M_m = D_{1m} - W = C' \cdot \left\{\tan\left[\frac{(n+0.5) \times A_0}{R'}\right] - \tan\left[\frac{(n-0.5) \times A_0}{R'}\right]\right\} - W,$$

$$m = 1, 2, 3, \ldots$$

wherein $A_0$ represents the sub-pixel pitch between the two sub-pixels respectively closest to the central axis of the active display region; C' represents a shortest linear distance from a position of an observer to the planar display panel; R' represents a linear distance from the position of the observer to a row or column of sub-pixels in the active display region of the planar display panel, wherein, the row or column of the sub-pixels in the active display region of the planar display panel is furthest away from the central axis of the active display region; W represents a first predetermined distance between the first sub-pixel and the second sub-pixel in the second direction and m is a positive integer and represents the amounts of the rows or columns of the sub-pixels located at one side of the central axis of the active display region.

* * * * *